United States Patent
Kepler et al.

(10) Patent No.: US 6,712,552 B1
(45) Date of Patent: Mar. 30, 2004

(54) GEOSYNTHETIC MATERIAL IRRIGATION SYSTEM

(75) Inventors: William F. Kepler, Golden, CO (US); Alice I. Comer, Katy, TX (US); Kurt F. Von Fay, Morrison, CO (US)

(73) Assignee: The United States of America as represented by the Department of the Interior, Washington, DC (US)

( * ) Notice: Subject to any disclaimer, the term of this patent is extended or adjusted under 35 U.S.C. 154(b) by 0 days.

(21) Appl. No.: 10/192,883

(22) Filed: Jul. 10, 2002

(51) Int. Cl.[7] ................................................ E02B 11/00
(52) U.S. Cl. ............................ 405/37; 405/38; 405/44; 405/45; 405/43; 472/92
(58) Field of Search ............................ 405/36, 37, 38, 405/39, 43, 44, 45, 51, 46; 472/92

(56) References Cited

U.S. PATENT DOCUMENTS

| | | | | |
|---|---|---|---|---|
| 728,088 A | * | 5/1903 | Dillon ........................ | 405/38 |
| 1,200,869 A | * | 10/1916 | Rife ........................... | 405/45 |
| 3,307,360 A | * | 3/1967 | Bailly ........................ | 405/38 |
| 3,908,385 A | * | 9/1975 | Daniel et al. .............. | 405/37 |
| 4,001,968 A | | 1/1977 | Green ........................ | 47/80 |
| 4,023,506 A | * | 5/1977 | Robey ........................ | 405/43 |
| 4,117,685 A | | 10/1978 | Skaife ....................... | 405/36 |
| 4,140,421 A | | 2/1979 | Lloyd ........................ | 405/43 |
| 4,257,191 A | | 3/1981 | Holter et al. .............. | 47/48.5 |
| 4,832,526 A | | 5/1989 | Funkhouser, Jr. .......... | 405/43 |
| 4,878,780 A | | 11/1989 | Vidal ........................ | 405/38 |
| 4,913,596 A | * | 4/1990 | Lambert, III .............. | 405/43 |
| 5,006,013 A | | 4/1991 | Burkstaller et al. ....... | 405/38 |
| 5,026,207 A | * | 6/1991 | Heath ........................ | 405/46 |
| 5,076,726 A | * | 12/1991 | Heath ........................ | 405/38 |
| 5,752,784 A | * | 5/1998 | Motz et al. ................ | 405/37 |
| 5,765,304 A | | 6/1998 | Clark ........................ | 47/58 |
| 5,788,413 A | | 8/1998 | Peggs ........................ | 405/129 |
| 5,839,659 A | * | 11/1998 | Murray ...................... | 239/1 |
| 5,848,856 A | * | 12/1998 | Bohnhoff ................... | 405/36 |
| 5,938,372 A | | 8/1999 | Lichfield ................... | 405/38 |
| 5,961,389 A | * | 10/1999 | Dickinson .................. | 472/92 |
| 6,178,691 B1 | | 1/2001 | Caron et al. ............... | 47/79 |
| 6,287,049 B1 | * | 9/2001 | Keinholz ................... | 405/46 |

\* cited by examiner

Primary Examiner—Frederick L. Legman
(74) Attorney, Agent, or Firm—Mark Homer

(57) ABSTRACT

The present invention is an economical and easily installed irrigation system for agricultural products covering large areas. The invention comprises top and bottom layers of geosynthetic material having a non-cohesive, porous material between the layers. A water distribution system is also placed between the layers. This system can be placed directly on the area to be irrigated without digging a trench or hole. Agricultural products, such as turf or row crops, are placed with top soil directly on the system.

16 Claims, 2 Drawing Sheets

GEOSYNTHETIC MATERIAL IRRIGATION SYSTEM

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to irrigation systems used for agricultural purposes, more particularly to irrigation systems that supply water to large areas, and most particularly to irrigation systems for agricultural purposes that can supply water to large areas of turf or row crops.

2. Description of the Related Art

Conventional irrigation systems include sprinklers, drip systems, flood irrigation, and french drains. In applying water to areas, the first three methods have very high water losses due to evaporation. This is not only costly, but in certain physical locations extra water may not be available for irrigation purposes. French drains can only provide water to point or line locations. Therefore, such a system cannot be used for broad areas.

Due to the problems associated with these conventional systems, specialized irrigation or watering systems have been developed for specific purposes. U.S. Pat. Nos. 4,140,421 and 4,117,685 describe underground pipe systems that require digging trenches in order to install the systems.

U.S. Pat. No. 4,001,968 describes an irrigation system for growing plants in hothouses having a sheet with one side being silica sand having a impermeable sheet with holes in it placed above the silica sand sheet placed within a pallet as used in hothouses. Water tubes are placed under the impermeable sheet and over the silica sand sheet. It is stated that the silica sand coating should not be of multiple grain thickness.

U.S. Pat. No. 4,257,191 describes using a layer of aluminum silicate above plastic foil. A pipe to distribute water is provided within the aluminum silicate layer. Above the aluminum silicate layer is a layer containing a mixture of aluminum silicate and soil. Above the mixed layer is a layer of fertile soil. The invention appears to be designed to work in planter pots or the like to grow potted plants.

U.S. Pat. No. 4,832,526 describes an underground watering system for an athletic facility having shallow, rounded trenches with a water pipe placed in the rounded bottom of the trenches. The trenches are filled with fine stone aggregate and covered with a water permeable fabric. A course layer of relatively course aggregate is placed over the fabric and another layer of relatively fine aggregate is placed over the course layer. The athletic playing surface is over the fine aggregate layer.

U.S. Pat. No. 4,878,780 describes a watertight membrane having a ballast layer of uniform rock covered by a water permeable layer. The permeable layer is covered by a layer of crushed volcanic rock or cinders. This layer, in turn, is covered by a finish layer. Water is inserted into the ballast layer. This system is dependent upon capillary action.

U.S. Pat. No. 5,006,013 describes built-up granular structure having a fine aggregate surface layer, a course aggregate reservoir layer with a topmost application of perforated adhesive material, and a dry moisture barrier layer having a topmost impervious layer. A containment wall having screened drainage surrounds the periphery of the structure to provide water.

U.S. Pat. No. 5,765,305 describes growing a transportable sod mat with grass seeds in a thin layer of growing medium spread over a mat of non-woven polypropylene laying on an impermeable membrane. After the seeds have germinated, the mat and growing medium is transplanted over a layer of porous material covering a conditioned subsoil. Drop irrigation lines are run through the upper region of the porous material.

U.S. Pat. No. 5,938,372 describes a subsurface irrigation system having a water resistant material with a pipe system placed upon it. Multiple diffusers are placed upon the pipe system having any overlaying material placed over each diffuser. Course sand may be placed over the overlaying material.

Finally, U.S. Pat. No. 6,178,691 describes a carpet irrigation system of four layers consisting of a water impermeable membrane base, a water permeable microperforated dark coloured top membrane having two water bearing capillary mats placed between the two membranes to which water are supplied through conventional irrigation.

As can be seen by the above, there have been many configurations of watering means developed for specialized purposes. However, there are inherent problems associated with all of the above systems. First, the majority of the systems must either be buried in trenches or can only be used in a pot or pallet. Therefore, if one desires to provide a simple, economical, irrigation system to a large surface area, the above systems cannot be employed or are very costly. Second, many of the above systems employ expensive or exotic materials in multiple layers such as fine stone aggregate, aluminum silicate, and specially perforated membranes. The complexity of manufacturing these systems along with the costly materials make them uneconomical for large area systems. Finally, most of these systems were designed for specialized purposes and cannot be employed for varying types of agricultural purposes. Therefore, it is desired to provide an economical system, that is easily installed, and may be used for a variety of agricultural purposes over large areas.

SUMMARY OF THE INVENTION

The present invention comprises an irrigation system that is economical and easily installed so that it may be applied to water a variety of agricultural products that cover large areas. Unlike current irrigation systems, the invention requires no trench or holes to be dug in order to accomplish installation. This greatly reduces both cost and installation time. Also, the system is made using relatively low-cost, easily obtained materials. Finally, the system contains a minimum of layers and parts so as to further reduce cost and simplify installation.

Accordingly, it is an object of this invention to provide a system to irrigate agricultural products over large areas.

It is a further object of this invention to provide a system to irrigate agricultural products over large areas that is more economical than current systems.

It is a further object of this invention to provide a system to irrigate agricultural products over large areas that can be used for a variety of different agricultural products.

A still further object of this invention is to provide a system to irrigate agricultural products over large areas that is more easily installed than current systems.

This invention accomplishes these objectives and other needs related to irrigation of agricultural products covering large areas by providing an irrigation system comprising top and bottom layers of geosynthetic material having a layer of non-cohesive, porous material between the two layers. The top geosynthetic layer comprises a permeable geosynthetic material. The bottom geosynthetic layer comprises a geosynthetic material that has a permeability equal to or less than the permeability of the top geosynthetic layer. The same geosynthetic material may be used for both layers. The non-cohesive, porous material preferably will be an easily obtained and to low-cost material such as sand, gravel, or a combination thereof. A water distribution system is placed between the geosynthetic layers with the non-cohesive, porous material in order to supply water to the non-cohesive porous material. The entire system can be placed on the specific area to be irrigated, without digging a hole or trench, and the agricultural products can be placed directly on the irrigation system, along with a layer of top soil, dependent upon the type of agricultural product.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The invention, as embodied herein, comprises an economical, easily installed irrigation system useable for a wide variety of agricultural products over large areas. The system is designed to provide irrigation to an area without the necessity of digging trenches or holes in order to install the system. A sheet construction method is used to install the system on top of large areas of land to be irrigated. Almost any type of agricultural product can then be placed atop the system, making it extremely simple and economical to install.

The materials used in the system are also very easily obtained and low-cost. As used herein, the term geosynthetic refers to a man-made material, preferably made of rubber or plastic, that is used to improve the properties of soil. These materials are typically manufactured in sheet form. The term geomembrane refers to geosynthetic materials that are preferably thin sheets of rubber or plastic and may function as a liquid or vapor barrier. The term geotextile refers to a geosynthetic material made of woven or non-woven synthetic fibers that is porous to liquid flow, both across and within the plane of the material. These terms are further described in chapter one of the reference book *Designing With Geosynthetics* by Robert M. Koerner, published by Prentice Hall, 1990, which is hereby incorporated by reference.

The system incorporates two layers of geosynthetic material having both a non-cohesive, porous material and a water distribution system between the layers of geosynthetic materials. As further described below, the geosynthetic materials are relatively low-cost, off-the-shelf type items, a large variety of low-cost water distribution systems can be used and are also readily available. The non-cohesive, porous material can be selected to be very low-cost, easily obtained materials such as sand or gravel. Due to the simplicity of installation of the present invention along with the low-cost of the materials useable within the system, the present invention may provide irrigation to large areas at significantly lower cost than current commercial irrigation systems.

Figure 1:
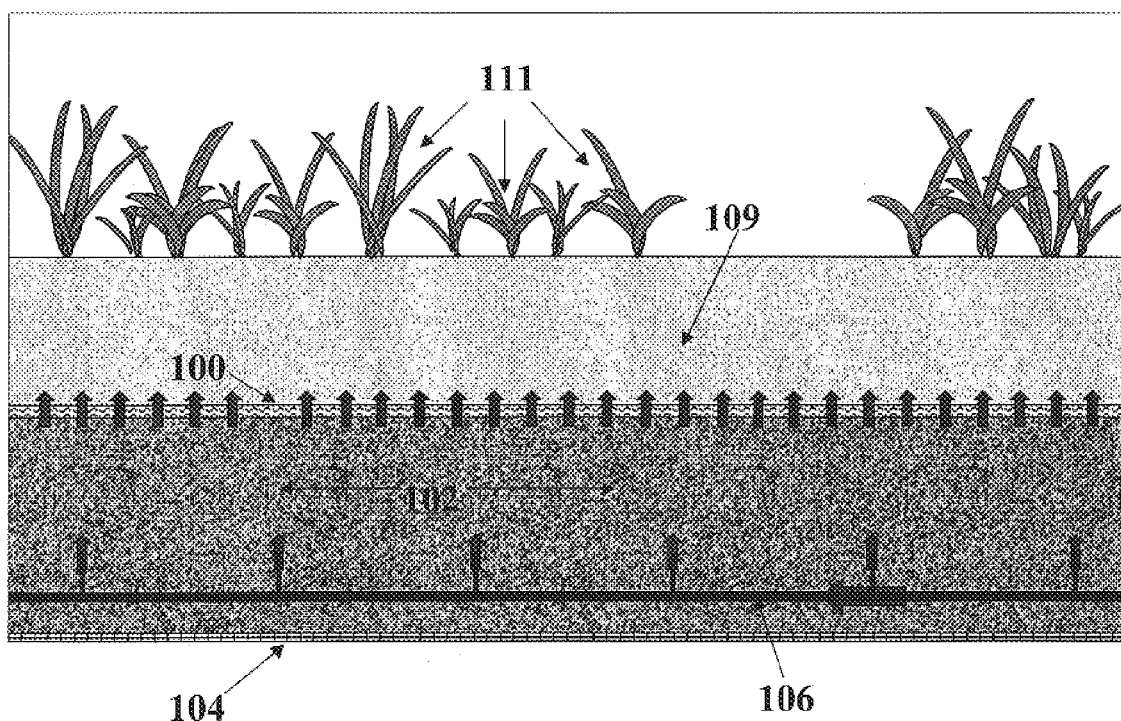
FIG. 1 is a cut-away side view of an embodiment of the composite material of the present invention.

FIG. 1 shows a cut-away of one simple embodiment of the invention. An upper layer 100 comprises a geosynthetic material that is water permeable. The upper layer 100 covers a layer of non-cohesive, porous material 102. A lower layer 104 comprises a geosynthetic material that comprises a permeability equal to or less than that of the upper layer 100. A water distribution system 106 is also placed between the upper layer 100 and lower layer 104 and is connected to a water source (see FIG. 2). A layer of soil 109 may be placed on top of the upper layer 100 and contain the agricultural product 111 to be irrigated. The depth of the layer of soil 109 would be dependent upon the agricultural product being grown and can range from almost no soil to almost a foot of soil.

Figure 2:
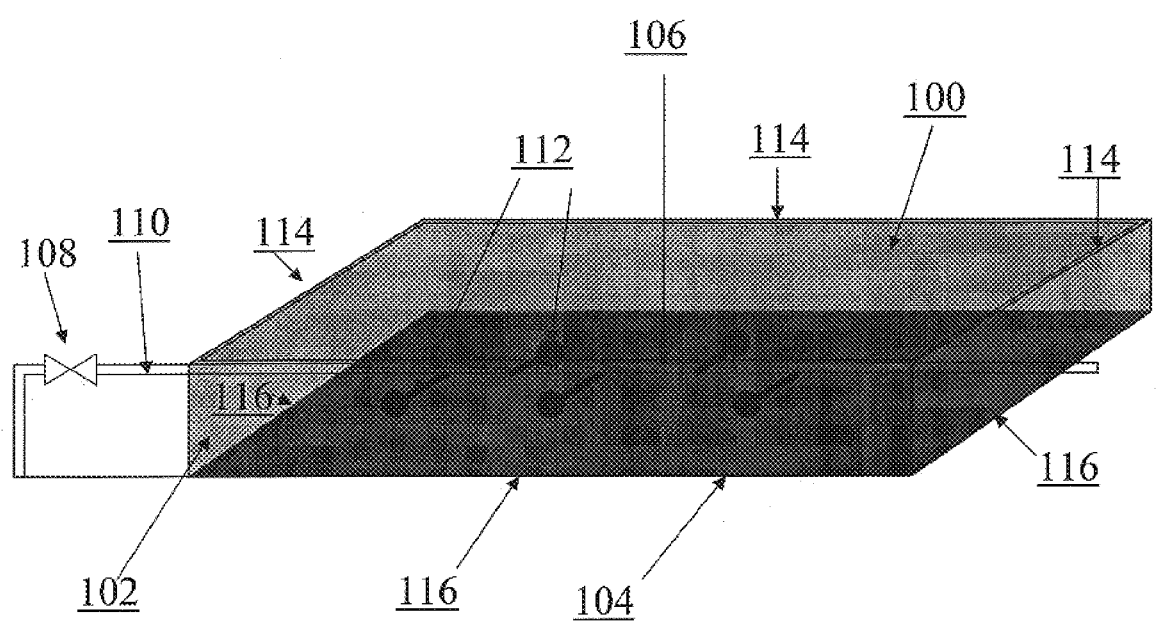
FIG. 2 is a transparent view of the embodiment of the invention of FIG. 1 including the water distribution system.

FIG. 2 shows a transparent view of a simplified version of the invention as it may be used in the field. A water source 108 is connected to a water distribution system 106 that is made up of a water line 110 having a plurality of emitters 112 extending from the water line 110. This water distribution system 106 is placed upon the lower layer 104 of geosynthetic material along with the non-cohesive, porous material 102. The lower layer 104 of geosynthetic material rests on the ground 120 covering the area requiring irrigation. Therefore, no trench or hole needs to be dug in order to install the system. Both the water distribution system 106 and the non-cohesive, porous material are covered by the upper layer 100 of geosynthetic material. The upper layer periphery 114 and the lower layer periphery 116 may be connected, using a method chosen by one skilled in the art, in order to keep the non-cohesive, porous material 102 in place and assist in preventing water runoff. The system may also include a berm (not shown) around the area to be irrigated in order to further ensure that water runoff is minimized. The size of the berm is dependent upon the size of the area being irrigated, the type of the agricultural product being grown, and, therefore, may be selected by one skilled in the art. When the water source 108 is turned on, it provides water, through the water distribution system 106, to saturate the non-cohesive, porous material 102.

The upper layer 100 and lower layer 104 geosynthetic materials may be selected by one skilled in the art. A preferred upper layer 100 material comprises a geotextile. Some examples of preferred geotextiles include a 4 ounce per square yard, non-woven geotextile; a 6.5 ounce per square yard, non-woven geotextile; a die-punched geotextile; an 18 mil thickness, needle punch geotextile; and a 22 mil thickness, needle punch geotextile. Preferred lower layer 104 materials include geotextiles or geomembranes. In one embodiment of the invention, the lower layer 104 material may be the same as the upper layer 100 material. In other embodiments of the invention, the lower layer 104 material may comprise a 30 mil high density polyethylene geomembrane or a 40 mil high density polyethylene geomembrane that are less permeable than the preferred geotextiles used for the upper layer 100 noted above.

The non-cohesive, porous material 102 may also be selected by one skilled in the art as long as it may transport or distribute the water provided by the water distribution system 106 and make said water available to the agricultural products above the irrigation system. Preferred non-cohesive, porous materials include sand, gravel, or a combination thereof due to the low cost and easy access to such materials. The thickness of the non-cohesive, porous material 102 may vary and can be chosen by one skilled in the art depending upon the agricultural product being irrigated. One preferred thickness range of the non-cohesive material is from about ¼ inch to about 2 inches.

Any water distribution system 106 may be used in the present invention as long as it transmits water in a manner that evenly wets the non-cohesive, porous material 102 throughout the area requiring irrigation. Many such systems are used in the art including drip pipes, perforated pipes, and pipes connected to diffusers. One preferred configuration of the water distribution system is provided in FIG. 2 and described above. Depending upon the area requiring irrigation, several of these water pipe 110/emitter 112 configurations may be placed side by side in order to transmit water more evenly over the entire area being irrigated. Any type of piping may be employed. Preferred piping includes plastic, low-cost pipe. One preferred size and configuration of the water distribution system 106 is the use of ⅝ inch polyethylene water pipe 110 and 1.0 gph emitters 112 spaced 12 inches on alternating sides of the water pipe 110.

Any water source 108 may be used in the present invention that may be regulated to provide certain amounts of water during certain time periods. One example is a direct water flow connected to a headwork featuring a 150-mesh screen filter, pressure gauge, flow meter, and control valve. A battery powered single station irrigation controller may be used in conjunction with this headwork to control the irrigation.

The invention also includes a method of irrigating an area for agricultural purposes using the elements of the above disclosed invention. The general steps of the method are as follows.

1. Laying the bottom layer 104 of geosynthetic material over the area;
2. Placing the water distribution system 106 on the bottom layer 104 of geosynthetic material;
3. Placing the layer of non-cohesive, porous material 102 onto the bottom layer 104 of geosynthetic material;
4. Placing the upper layer 100 of geosynthetic material over the layer of non-cohesive, porous material 102;
5. Connecting peripheries 114 of the upper and bottom layers 100, 104 of the geosynthetic materials;
6. Placing a layer of soil 109 over the upper layer 100 of geosynthetic material;
7. Placing an agricultural product 111 in the soil 109; and,
8. Providing water through the water distribution system.

More preferred embodiments of the method can be practiced using the added and preferred elements of the invention discussed above.

The following describes an example of the installation procedures for an embodiment of the present invention.

EXAMPLE 1

The below describes construction of an embodiment of the system for a 30 foot by 30 foot turf plot.

Place a 30 ft wide by 30 ft long piece of 4.5 oz non-woven geotextile on the ground. Lay a grid of water lines on the geotextile (⅝" polyethylene pipe), evenly spaced as follows. Place a feeder line about 6 inches in from the one edge of the geotextile along the entire edge of the geotextile. Connect a water supply line to the feeder line. Connect 10 longitudinal water lines (⅝" polyethylene pipe) at about 3-foot centers to the feeder line. Place the longitudinal lines next to the edge of the geotextile 1½-feet in from the edge. Terminate the longitudinal water lines by connecting to a drain line (⅝Δ polyethylene pipe). The drain line runs along the opposite edge of the feeder line. Install a drain outlet to one end of the drain line. When the feeder line, longitudinal lines and drain line are connected properly, all the lines are interconnected so that water pressure is fairly evenly distributed throughout the system. Connect ¼" diameter, 12 inch long distribution tubes, to the longitudinal lines in a staggered pattern 18 inches apart. Connect the tubes so that they are on opposite sides of the longitudinal water lines every 18-inches. In addition, the tubes should be placed such that they are between tubes from adjacent longitudinal water lines, and not coincident with them. Along the edges of the geotextile, the ¼" distribution tubes are 6 inches long. Connect 1 gallon per hour emitters to the end of each ¼" distribution tube. Test the system by turning on the water to the system. Make sure all of the emitters are working. Cover the geotextile bottom and piping with about 1½" of sand. Test the system again. Ensure that all of the sand is getting wet. Place another layer of 4.5 oz non-woven geotextile on top of the sand. Use hot-glue to connect all four edges of the bottom and top geotextile layers. Test the system again. Make sure that all of the top layer is getting wet. The system is ready to be covered with sod or topsoil.

EXAMPLE 2

The below describes construction of an embodiment of the invention for a 200 foot long by 6 inch wide row crop.

Lay a 200 foot long by 12 inch wide section of 4.5 oz non-woven geotextile. Connect input pipe (⅝" polyethylene pipe) to water source. Connect a single 200 foot long longitudinal line (⅝" polyethylene pipe) to the input pipe. Place this pipe about 3 inches from one edge of the geotextile. Install a drain at the end of longitudinal line opposite the input pipe. Connect 1 gallon per hour emitters directly to the longitudinal line at 12 inch centers, staggering the pattern on each side of the longitudinal line. Test the system by turning on the water to the system. Make sure all of the emitters are working. Cover one-half of the geotextile bottom and piping with about 1½" of sand. Test the system again. Make sure that all of the sand is getting wet. Fold the other one-half of the geotextile over, then glue the edges together with a hot glue gun. Test the system again. Ensure that all of the top layer is getting wet. The system is ready to be covered with topsoil and/or row crops.

What is described are specific examples of many possible variations on the same invention and are not intended in a limiting sense. The claimed invention can be practiced using other variations not specifically described above.

What is claimed is:

1. A system to irrigate an area for agricultural purposes, comprising:
    an upper layer of a permeable geosynthetic material, comprising a geotextile porous to liquid flow across a plane of the geotextile and within the plane of the geotextile, having a first permeability;
    a lower layer of geosynthetic material having a permeability equal to or less than the first permeability;
    a non-cohesive, porous material between the upper and lower layer; and,
    a water distribution system, connected to a water source, between the upper and lower layer that distributes water to the non-cohesive, porous material wherein the system may be placed on the area and covered with agricultural products to be irrigated.

2. The system of claim 1, further comprising a layer of soil on the upper layer, having the agricultural products therein.

3. The system of claim 2, wherein the non-cohesive, porous material comprises sand, gravel or a combination thereof.

4. The system of claim 3, wherein the lower layer comprises a geotextile material or a geomembrane material.

5. The system of claim 4, wherein the water distribution system comprises a plurality of tubes having a plurality of plastic fittings that release water at a specified rate.

6. The system of claim 5, wherein the non-cohesive, porous material comprises a thickness from about one-quarter inch to about two inches.

7. The system of claim 6, wherein the upper layer is selected from a non-woven geotextile having a weight from about 4 ounces per square yard to about 6.5 ounces per square yard, a needle punch geotextile having a thickness of from about 18 mils to about 22 mil, or a die-punched geotextile.

8. The system of claim 7, wherein the bottom layer comprises a high density polyethylene geomembrane.

9. The system of claim 7, wherein the bottom layer is selected from a non-woven geotextile having a weight from about 4 ounces per square yard to about 6.5 ounces per square yard, a needle punch geotextile having a thickness of from about 18 mils to about 22 mils, or a die-punched geotextile.

10. The system of claim 2, wherein the upper layer further comprises a first periphery and the lower layer further comprises a second periphery wherein the first and second peripheries are connected.

11. A method of irrigating an area for agricultural purposes, comprising the steps of:

laying a geosynthetic material, having a first permeability, over the area; placing a plurality of tubes, connected to a water source, having a plurality of plastic fittings that release water at a specified rate on the geosynthetic material;

placing a layer of non-cohesive, porous material onto the geosynthetic material;

placing a layer of a permeable geosynthetic material, comprising a geotextile porous to liquid flow across a plane of the geotextile and within the plane of the geotextile, having a permeability equal to or greater than the first permeability, over the layer of non-cohesive, porous material;

connecting peripheries of the layers of the geosynthetic materials;

placing a layer of top soil over the permeable geosynthetic material;

placing an agricultural product in the top soil; and, providing water, from the water source, to the plurality of tubes.

12. The method of claim 11, wherein the geosynthetic material comprises a geotextile or a geomembrane.

13. The method of claim 12, wherein the non-cohesive, porous material comprises a thickness from about one-quarter inch to about two inches.

14. The method of claim 13, wherein the permeable geosynthic material is selected from a non-woven geotextile having a weight from about 4 ounces per square yard to about 6.5 ounces per square yard, a needle punch geotextile having a thickness of from about 18 milliliters to about 22 milliliters, or a die-punched geotextile.

15. The method of claim 14, wherein the geosynthetic material is selected from a non-woven geotextile having a weight from about 4 ounces per square yard to about 6.5 ounces per square yard, a needle punch geotextile having a thickness of from about 18 milliliters to about 22 milliliters, a die-punched geotextile, or a high density polyethylene geomembrane.

16. A system to irrigate an area for agricultural purposes, consisting essentially of:

an upper layer of a permeable geosynthetic material, comprising a geotextile porous to liquid flow across a plane of the geotextile and within the plane of the geotextile, having a first permeability;

a lower layer of geosynthetic material having a permeability equal to or less than the first permeability;

a non-cohesive, porous material between the upper and lower layer; and, a water distribution system between the upper and lower layer that supplies water to the non-cohesive, porous material wherein the system may be placed on the area and covered with agricultural products to be irrigated.

* * * * *